United States Patent [19]
Songer

[11] Patent Number: 5,805,205
[45] Date of Patent: Sep. 8, 1998

[54] SIMULATANEOUS TWO-DIMENSIONAL AND THREE-DIMENSIONAL IMAGING SYSTEM USING A BIFURCATED, DUAL-APERTURE LIGHT VALVE

[75] Inventor: Jimmie D. Songer, Burleson, Tex.

[73] Assignee: Magma, Inc., Fort Worth, Tex.

[21] Appl. No.: 610,741

[22] Filed: Mar. 4, 1996

Related U.S. Application Data

[63] Continuation of Ser. No. 218,108, Mar. 28, 1994, abandoned.

[51] Int. Cl.$^6$ .................................................. H04N 13/00
[52] U.S. Cl. ................................................. 348/49; 348/56
[58] Field of Search ................................... 348/42, 43, 44, 348/46, 49, 51, 53, 54, 55, 56

[56] References Cited

U.S. PATENT DOCUMENTS

| | | | |
|---|---|---|---|
| 3,712,199 | 1/1973 | Songer, Jr. | 95/18 R |
| 3,737,567 | 6/1973 | Kratomi | 348/56 |
| 3,821,466 | 6/1974 | Roese | 348/56 |
| 4,021,846 | 5/1977 | Roese | 358/92 |
| 4,424,529 | 1/1984 | Roese et al. | 348/56 |
| 4,523,226 | 6/1985 | Lipton et al. | 348/49 |
| 4,562,463 | 12/1985 | Lipton | 348/56 |
| 4,630,097 | 12/1986 | Marks | 358/3 |
| 4,884,876 | 12/1989 | Lipton et al. | 348/56 |
| 4,907,860 | 3/1990 | Noble | 348/42 |
| 4,943,852 | 7/1990 | Femano et al. | 348/49 |
| 4,967,268 | 10/1990 | Lipton et al. | 358/3 |
| 5,028,994 | 7/1991 | Miyakawa et al. | 348/49 |
| 5,293,227 | 3/1994 | Prince | 348/53 |

OTHER PUBLICATIONS

J. songer, "New Video West Instant Replay System is Reflex and Wireless," American Cinematographer, vol. 52, No. 7, Jul. 1971, pp. 668–669, 718–719.

K. Wales, "The Video West, Inc. Three Dimensional Photographic System," American Cinematographer, vol. 55, No. 4, Apr. 1974, pp. 410–411, 466, 471.

*Primary Examiner*—Tommy P. Chin
*Assistant Examiner*—Bryan S. Tung
*Attorney, Agent, or Firm*—David Newman & Associates, P.C.

[57] ABSTRACT

A system and method for imaging and viewing, by a viewer, color and monochrome images as simultaneously three-dimensional and two-dimensional images. The invention comprises a camera device, a viewing device for displaying the images, a transmitter for transmitting a drive signal, and at least one pair of viewing glasses. The camera device includes a single imaging lens having a bifurcated, dual-aperture light valve, and a single image space for receiving and overlaying a plurality of left-eye images and a plurality of right-eye images at a field rate driven by the drive signal. The pair of viewing glasses includes a left-viewing-light valve and a right-viewing-light valve. In response to receiving the drive signal, the left-viewing-light valve opens and closes, synchronized with the field rate, for viewing the plurality of left-eye images. The right-viewing-light valve, responsive to the drive signal, opens and closes synchronized with the field rate, but alternatingly with the left-viewing-light valve, for viewing the plurality of right-eye images. The plurality of left-eye images and the plurality of right-eye images appear three-dimensional when viewed through the pair of viewing glasses, and appear two-dimensional when viewed without the glasses.

18 Claims, 9 Drawing Sheets

₵ OF OPTICAL CENTER

₵ OF OPTICAL CENTER

LEFT-EYE FIELD   RIGHT-EYE FIELD

SIMULTANEOUS TWO-DIMENSIONAL AND THREE-DIMENSIONAL IMAGING SYSTEM USING A BIFURCATED, DUAL-APERTURE LIGHT VALVE

This application is a continuation of U.S. patent application Ser. No. 08/218,108, filed Mar. 28, 1994, now abandoned.

BACKGROUND OF THE INVENTION

This invention relates to color television, and more particularly to three-dimensional television images as viewed through an appropriate viewing device and, in the alternative, as two-dimensional images with normal clarity and definition when viewed by the unaided eye. The same principles relied upon in the context of television also may be applied to motion pictures.

DESCRIPTION OF THE RELEVANT ART

Stereoscopic, three-dimensional motion pictures and the television broadcast of these motion pictures have been available in an anaglyphic format requiring special glasses which prevented their enjoyment in natural color. Other non-anaglyphic, three-dimensional systems may be viewed in color but, because of obtrusive flicker and ghosting images, are incompatible with motion picture standards or NTSC and other world-wide television and industrial standards and therefore cannot be broadcast.

Furthermore, cameras capable of capturing most three-dimensional imaging require binocular-lens configurations and proximity to the object to create the three-dimensional illusion. These systems are not easily adapted to the use of variable focal-length lenses and, without excessive ocular separation, are restricted in range to a maximum of approximately sixty feet. In addition to the physical limitations of the hardware itself, binocular lens systems are awkward and difficult to use, and often demand special skills or training before a satisfactory three-dimensional effect can be achieved.

Due to these and other limitations, a long-felt need has existed in the industry for a three-dimensional system which can capture images with variable, as well as fixed, focal-length lenses, while requiring only average camera-operational skills. A three-dimensional system capable of fulfilling this need must provide images having three-dimensional effects when viewed through special viewing devices, while also presenting those same images in normal two-dimensional format for viewers using the unaided eye. A two-dimensional/three-dimensional capability such as this would render the resulting system acceptable for NTSC and other world-wide television and industrial standards transmission or motion pictures.

In the prior art, stereoscopic-viewing devices for non-anaglyphic, three-dimensional, television systems require the transmission of synchronization signals from a transmitting device, located in the vicinity of the viewing device, to the stereoscopic-viewing devices. The range of these synchronization signals is often severely limited, and seldom exceeds thirty feet. In addition to limitations on distance, the transmitting device also is restricted to a narrow angular range, basically requiring that the stereoscopic-viewing devices be directly in front of the transmitting device. Thus, a viewer using a prior art stereoscopic-viewing device would have to device remain within thirty feet directly in front of the viewing device in order to enjoy a three-dimensional effect. These limitations created a need in the industry for a synchronous signal that is effective over a wide range of, for example, several hundred yards, and which remains effective in any direction from the viewing screen.

In addition to being limited in terms of range, the prior art also suffers from incompatibilities with the nature of many viewing environments. More specifically, many of the non-anaglyphic viewing devices use vertical odd or even pulses with the horizontal pulse divided-by-ten added to the left or right field for left-eye or right-eye synchronization decoding. The pulses for these viewing devices are often transmitted at 60-cycles. If the viewing device were operating in an environment containing ambient light at the same 60-cycle pulse, then the infrared pulse emanating from the lamp may cause annoying, or even severe, degradation to the viewed image by upsetting the synchronization of the viewing device.

SUMMARY OF THE INVENTION

A general object of the present invention is a natural-color or monochrome, three-dimensional imaging and viewing system, including method, apparatus, and product, which overcomes the above limitations and disadvantages using a single-image space, dual-aperture light-valve, single-lens system which meets NTSC and other world-wide television and industrial broadcasting standards and motion-picture standards, and that will increase the viewing range of the stereoscopic viewing device.

Another object of the invention is a three-dimensional imaging system of the above character which is free of keystone effects and uses a multiple-path technique having identical path-lengths so that distortion produced by path-length ocular differences is eliminated and therefore is particularly adapted for use in micro-imaging and macro-imaging applications where two-dimensional viewing is as important as three-dimensional viewing.

A further object of the invention is a three-dimensional imaging system of the above character and, particularly, method and apparatus for producing three-dimensional images which are convenient and practical to implement by modification to existing lenses synchronized to the field-rate of an electronic camera or the exposure timing of a motion-picture camera.

A still further object of the invention is a three-dimensional imaging system of the above character in which the resulting images are comfortable to view either utilizing special viewing devices for achieving the three-dimensional effect, or using the unaided eye for normal, compatible, two-dimensional images having normal clarity and definition.

Another object of the invention is to provide a three-dimensional imaging system of the above character utilizing the standard 50 Hz, 60 Hz, 72 Hz, 120 Hz, or higher television formats at any vertical frequency from 48 Hz to 400 Hz of electronic display devices and motion pictures.

As embodied herein, the invention comprises a camera device, a viewing device, first transmitting means, at least one pair of viewing glasses, and, optionally, second transmitting means.

The camera device includes a single imaging lens, bifurcated, dual-aperture light valves, first converting means and generating means. The bifurcated dual-aperture light valves are an integral part of the optical system. The bifurcated dual-aperture light valves are located within the camera device and include a single image space which receives a plurality of left-eye images and a plurality of right-eye images. The first converting means converts the plurality of left-eye images and the plurality of right-eye images to an image signal. The generating means generates a drive signal synchronized to an identified, vertical field rate to control the bifurcated, dual aperture light valves.

The camera device can be embodied as a television camera, a motion picture camera, or other electronic or mechanical camera device. The generating means may be embodied as a signal generator, a vertical synchronization pulse generator, or other equivalent generating means. The converting means can be embodied as an image converter.

The viewing device includes a tuner device, a receiving unit, second converting means and second transmitting means. The tuner device receives the image signal. The receiving unit receives the drive signal. The second converting means reconverts the image signal to the plurality of left-eye images and the plurality of right-eye images.

The pair of viewing glasses includes receiving means, a left-viewing-light valve and a right-viewing-light valve. The viewing glasses may include a pair of eyeglass frames. The left-viewing-light valve and the right-viewing-light valve may be embodied, for example, as a pair of liquid crystals. The receiving means may be embodied as a receiver.

The generating means generates a drive signal synchronized to an identified, vertical field rate to control the bifurcated, dual-aperture light valves. The bifurcated dual-aperture light valves alternatingly and field-sequentially image an object as a plurality of left-eye images and a plurality of right-eye images at the field rate. The plurality of left-eye images and the plurality of right-eye images are overlaid on a single image space within the camera device. The first converting means converts the plurality of left-eye images and the plurality of right-eye images to an image signal.

The first transmitting means transmits the image signal and the drive signal to the viewing device. The tuner device receives the image signal. The receiving unit receives the drive signal. The second converting means reconverts the image signal to the plurality of left-eye images and the plurality of right-eye images.

The second transmitting means retransmits the drive signal to the pair of viewing glasses. The receiving means receives the drive signal. In response to the drive signal, the left-viewing-light valve opens and closes at a rate synchronous with the field rate. Opening and closing the left-viewing-light valve allows viewing the plurality of left-eye images. In response to the drive signal, the right-viewing light valve opens and closes at a rate synchronous with the field rate. Opening and closing the right-viewing-light valve allows viewing the plurality of right-eye images. The right-viewing-light valve opens and closes alternatingly with the left-viewing-light: valve. As used in this application, "alternatingly" means that when the left-viewing-light valve is open, the right-viewing-light valve is closed; and, when the right-viewing-light valve is open, the left-viewing-light valve is closed. When viewed through the viewing glasses, the image on the viewing device appears three-dimensional. In the absence of the viewing glasses, the combined image appears as a two-dimensional image having normal clarity.

As an alternative embodiment, the invention includes the method for simultaneously imaging broadcasting two-dimensional and three-dimensional color and monochrome images. The method includes the steps of generating a drive signal synchronized to an identified, vertical field rate to control bifurcated, dual-aperture light valves; alternatingly and field-sequentially imaging, using the single imaging lens, a plurality of left-eye images and a plurality of right-eye images at the field rate; converting the plurality of left-eye images and the plurality of right-eye images to an image signal; transmitting the image signal to the remote viewing device; converting the image signal to the plurality of left-eye images and the plurality of right-eye images; transmitting the drive signal to each pair of viewing glasses; receiving the drive signal at the receiver of each pair of viewing glasses; generating a synchronization pulse to synchronize the viewing glasses to the field rate; and alternatingly opening and closing, responsive to receiving the drive signal, the left-viewing-light valve and the right-viewing-light valve, at a rate synchronous with the field rate, to allow viewing the plurality of left-eye images and the plurality of right-eye images for achieving three-dimensional effect. In the absence of the viewing glasses, the left-eye images and the right-eye images appear as a two-dimensional image having normal clarity.

The current invention further provides a three-dimensional imaging system in which the resulting image is optically sharp at the focal plane, i.e., zero binocular-disparity, and in which the ocular disparity is proportional to the depth of field of the single lens. In some applications the binocular disparity can also be made proportional to the unfocused blur normally associated with an unfocused image, i.e., the three-dimensional information is carried in the blur normally associated with the depth of field of the taking lens.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
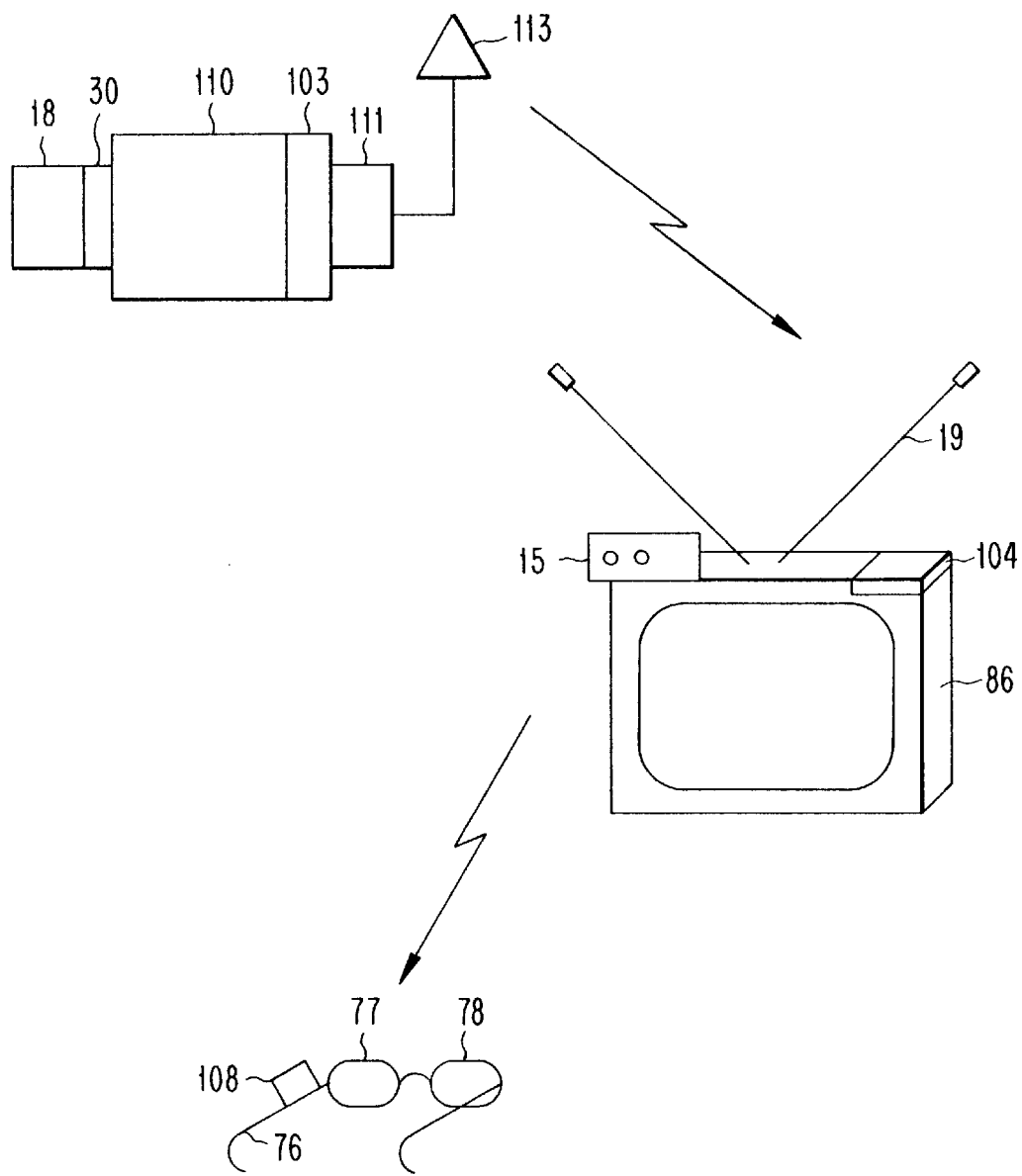
FIG. 1 shows a simplified diagram of the preferred embodiment including a camera device, viewing device, and a pair of viewing glasses.

Reference now is made in detail to the present preferred embodiments of the invention, examples of which are illustrated in the accompanying drawings, wherein like reference numerals indicate like elements throughout the several views.

The present invention provides a two-dimensional and a three-dimensional imaging system for imaging and viewing color and monochrome images, in accordance with NTSC, PAL, SECAM, and other world-wide electronic viewing formats. For three-dimensional imaging, the viewer must have a left eye and a right eye. The system comprises a camera device, first transmitting means, a viewing device, and at least one pair of viewing glasses. The camera device includes generating means, focusing means, imaging means, and first converting means. The generating means is coupled to the imaging means. The imaging means is an integral part of the focusing means. The first converting means is in spatial relation with, or in view of, the imaging means.

Within the camera device, the generating means generates a drive signal synchronized to an identified, vertical field rate for controlling the imaging means. As will be understood by those skilled in the art, references to "field rate" within this patent refer generally to a television camera concept, and as used herein are interchangeable with and functionally equivalent to the concept of "frame rate" as used in the context of motion picture cameras. The focusing means focuses an image of an object. In response to the drive signal, the imaging means alternatingly and field-sequentially images the object at the field rate. The images of the object include a plurality of left-eye images and a plurality of right-eye images. The first converting means converts the plurality of left-eye images and the plurality of right-eye images to an image signal, or to an image on film.

The viewing device includes second converting means and first receiving means. The first receiving means receives the image signal. The second converting means is located as part of or within the viewing device. The second converting means converts the image signal to the plurality of left-eye images and the plurality of right-eye images, for displaying on the viewing device. The viewing device may be embodied as a silver screen, as commonly used in a movie theater, or as a picture tube or equivalent, as commonly used in a television set.

Each pair of viewing glasses includes left opening-and-closing means, and right opening-and-closing means. The left opening-and-closing means is located within the left viewing aperture of the frame of eyeglasses, and the right opening-and-closing means is located within the right viewing aperture of the frame of eyeglasses. In the preferred embodiment, each pair of viewing glasses optionally includes second receiving means. The second receiving means typically is located on or within the frames of the pair of viewing glasses. The second receiving means is coupled to the left opening-and-closing means and the right opening-and-closing means. In an alternative embodiment, each pair of viewing glasses has second receiving means embodied as a television tuner device and a receiver.

As configured in the preferred embodiment, the second receiving means receives the drive signal. The drive signal may have been transmitted from either first transmitting means or second transmitting means. Driven by the drive signal received by the second receiving means, the left opening-and-closing means opens and closes synchronized with the field rate. The opening and closing of the left opening-and-closing means allows a viewer to view the plurality of left-eye images.

Driven by the drive signal received by the second receiving means, the right opening-and-closing means opens and closes synchronized with the field rate to allow viewing the plurality of right-eye images. The right opening-and-closing means opens and closes alternatingly from the left opening-and-closing means. As used herein, "alternatingly" means that when the left opening-and-closing means is open, the right opening-and-closing means is closed; and, when the right opening-and-closing means is open, the left opening and closing means is closed.

Thus, when viewed with glasses, the plurality of left-eye images and the plurality of right-eye images appear to the viewer as a three-dimensional image on the viewing device. When viewed without the glasses, the plurality of left-eye images and the plurality of right-eye images appear to the viewer as a two-dimensional image on the viewing device.

In the exemplary arrangement shown in FIG. 1, the camera device is shown with generating means, focusing means, and imaging means embodied as signal generator ill, an imaging lens 18, and bifurcated, dual-aperture light valves 30, respectively. The bifurcated, dual-aperture light valves are located as an integral part of the optical system, whether in front of, within, or in back of the imaging lens 18. The imaging means may be embodied as liquid crystals, or some electro-mechanical devices, such as micro square mirrors, i.e. moving mirror technology, that swivel on two corners. The imaging means also may be embodied as a mechanical half-moon shutter rotating parallel to the optical axis. The mechanical half-moon shutter creates an ideal light valve since nothing is introduced into the optical path of a precision optical system during exposure time. The liquid crystals, however, introduce vinyl or glass into the optical path which cause either adding or subtracting of the focal length, aberration or flair. Additionally, the bifurcated, dual-aperture light valves are coupled to the signal generator 111.

The signal generator 111 generates a drive signal synchronized to an identified, vertical field rate to control the bifurcated, dual-aperture light valves. The drive signal drives the dual-aperture light valves, causing the dual-aperture light valves to alternatingly and field-sequentially image, at the field rate, an object as a plurality of left eye images and a plurality of right eye images.

The camera device can be embodied as a television camera, a motion picture camera, or other electronic or mechanical camera device to which a lens might be attached, and uses the standard television formats of 50 Hz, 60 Hz, 72 Hz, and 120 Hz, as well as television formats at any vertical field frequency from 48 Hz to 400 Hz. The first converting means may be embodied as an image converter such as film, video tape, or other recording medium. The generating means may be embodied as a vertical synchronization pulse generator, or other equivalent generating means.

The plurality of left eye images and the plurality of right eye images typically are converted to an image signal and sent to the viewing device.

The viewing device, as shown in FIG. 1, is embodied as a television receiver 86. The television displays the plurality of left eye images and the plurality of right eye images. The television receiver includes second converting means for reconverting the image signal to the plurality of left-eye images and the plurality of right-eye images. The viewing device may also include second transmitting means for transmitting the drive signal. As illustrated in FIG. 1, the first receiving means is embodied partially as an antenna 19. The second converting means is embodied as a signal converter 104. The embodiment shown in FIG. 1 includes second transmitting means. The second transmitting means is embodied as a transmitter 15.

The signal converter 104 is located within the television receiver 86. The signal converter converts the image signal to the plurality of left-eye images and the plurality of right-eye images. The signal converter 104 may include appropriate electronic circuitry for alternatingly and field-sequentially interlacing the plurality of left-eye images and the plurality of right-eye images.

The pair of viewing glasses is depicted in FIG. 1 as a pair of eyeglasses 76. In accordance with the preferred embodiment as illustrated in FIG. 1, at each pair of glasses the second receiving means may be embodied as a receiver 108, and the left opening-and-closing means may be embodied as a left-viewing-light valve 77 and the right opening-and-closing means may be embodied as a right-viewing-light valve 78. The left-viewing-light valve and the right-viewing-light valve may use liquid crystals for opening and closing.

The receiver 108 receives the drive signal transmitted from the transmitter 15. Using the drive signal, the left-viewing-light valve opens and closes synchronized with the field rate. The opening and closing allows viewing by the left eye the plurality of left-eye images. Similarly, using the drive signal, the right-viewing-light valve 78 opens and closes synchronized with the field rate for viewing the plurality of right-eye images. The right-viewing-light valve, however, opens and closes alternatingly from the left-viewing-light valve.

As broadly depicted in FIG. 1, a preferred embodiment of the present invention comprises a television camera 110, a television set 86, and at least one pair of viewing glasses 76. The television camera 110 includes a single imaging lens 18 having bifurcated, dual-aperture light valves 30, an image signal generator 103, a signal generator 103, and a transmitting antenna 113. The television receiver 86 includes an antenna 19, an electronic transmitter 15 and a signal converter 104. The pair of viewing glasses 76 includes a left-viewing-light valve 77 and a right-viewing-light valve 78.

Figure 2:
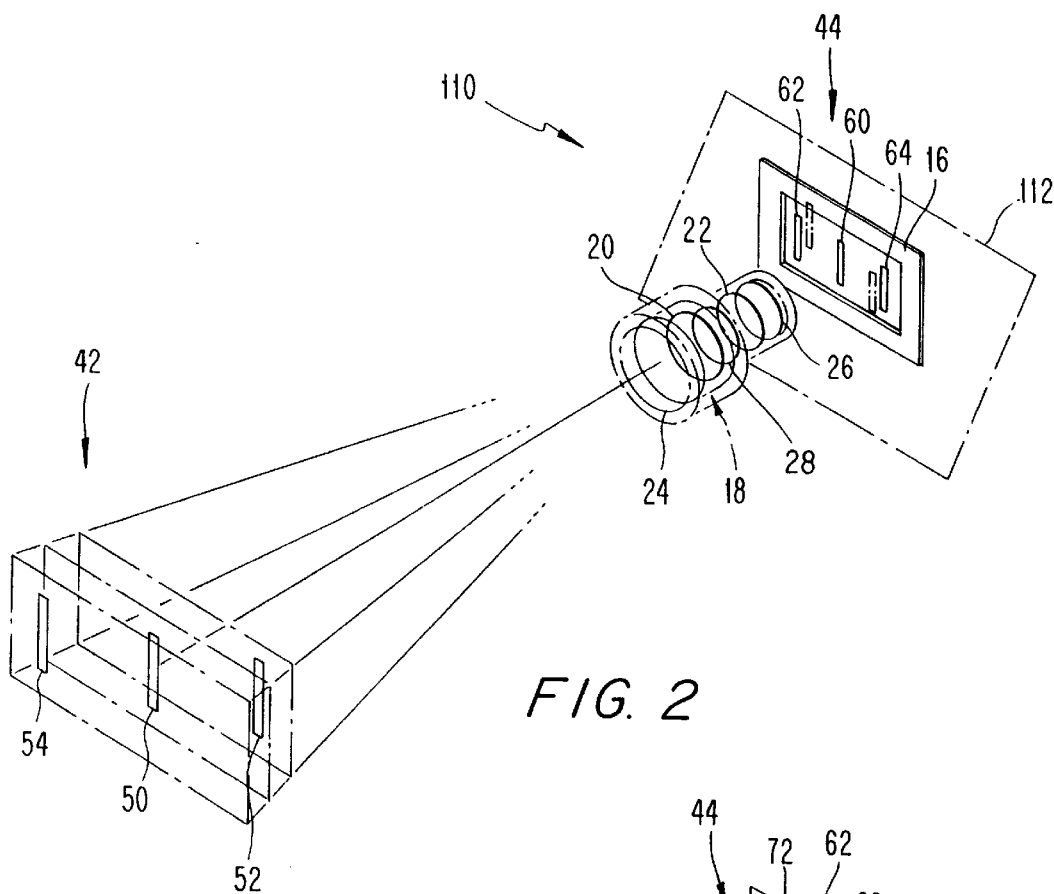
FIG. 2 shows a simplified diagram of a lens modified in accordance with the present invention.
Figure 3:
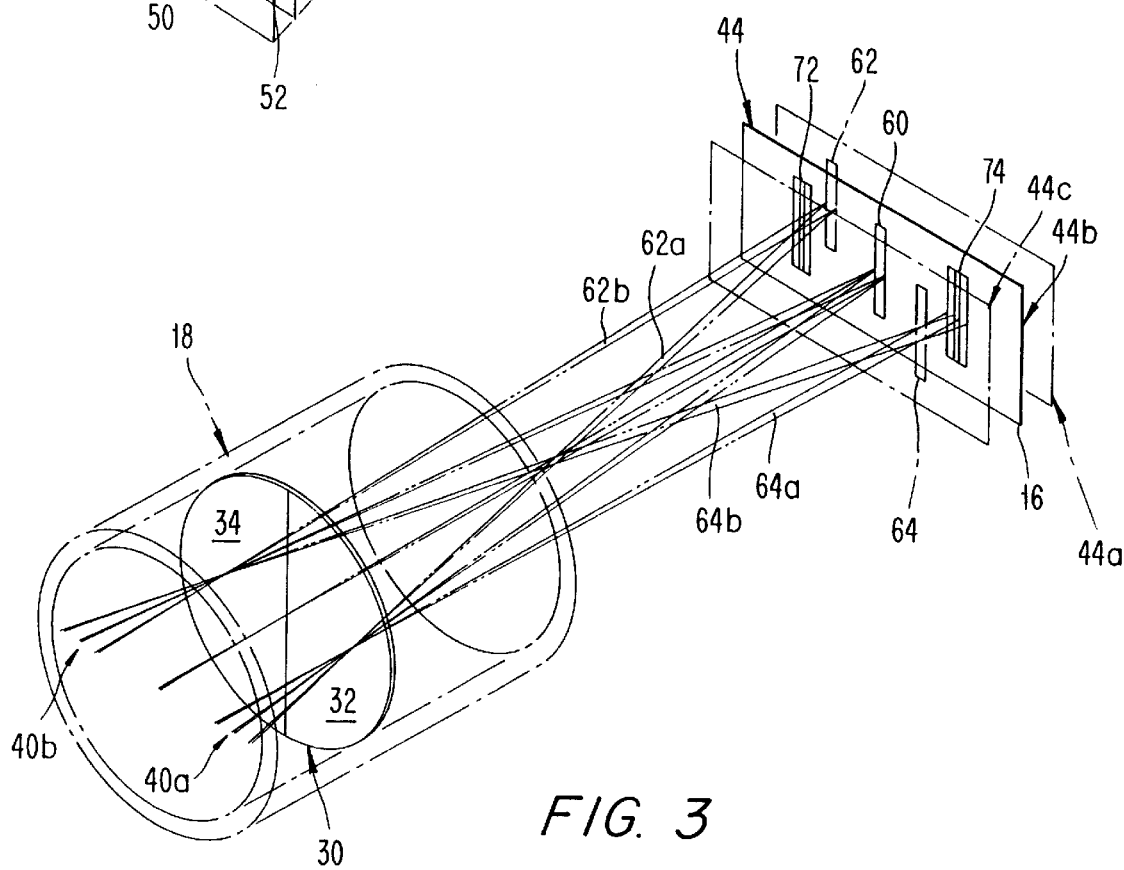
FIG. 3 shows an enlarged schematic diagram of the camera lens and imager of the camera shown in FIG. 3.
Figure 4:
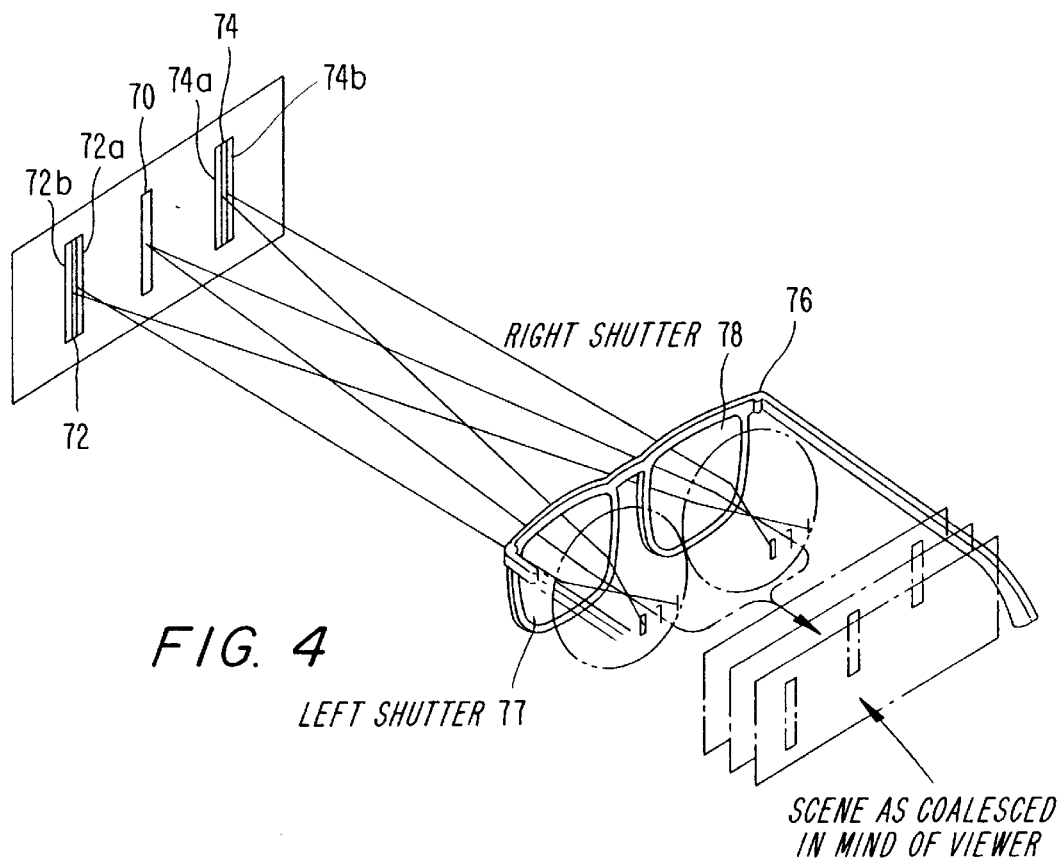
FIG. 4 is a plane view illustrating the geometry of viewing a three-dimensional picture in accordance with the present invention.
Figure 5:
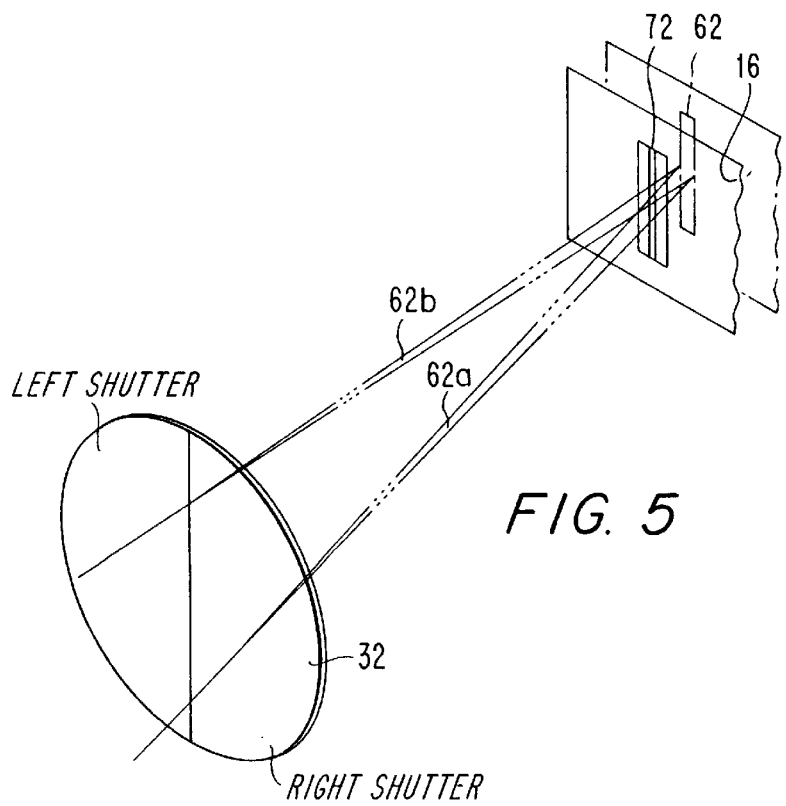
FIG. 5 illustrates the ocular separation.

As illustratively shown with greater detail in FIGS. 2 and 3, a camera 110 is depicted in accordance with the present invention. The camera 110 includes a camera body 112 enclosing an imaging charged coupled device (CCD) 16. The camera body 112 may be either a television camera or a motion-picture camera. A lens 18 is mounted to the camera body 112 and is positioned to form an image at its plane of focus. The plane of focus coincides with the plane of the imaging CCD 16. No loss in generality results if the plane of focus were assumed to be precisely at the particular plane of the imaging device 16, since for any practical lens some plane of focus is so located. As used herein, this plane is defined in correspondence to its counterpart in object space as the object plane and image plane of interest. The imaging material may be of common variety such as a charged coupled device (CCD) in a television camera or 35 millimeter film in a motion-picture camera.

The lens is schematically shown in the drawings and is generally of the double-meniscus, anastigmatic type having two negative-meniscus inner doublets 20, 22 and outer positive elements 24, 26. The outer positive elements have been compounded as a doublet. This lens has an aperture stop located between the inner-meniscus elements 20, 22. The existence of the aperture stop is assumed in the present invention and lenses which might be the subject of a modification in accordance with this invention are found to have at least one aperture stop. Accordingly, the disclosure of a particular modified lens herein is for the purpose of illustration and is not to be taken as a limitation.

One general characteristic of a lens system is the existence of a plane, physically associated with reference to the lens, termed the aperture-stop plane. This aperture stop limits the size of the axial cone of energy which is accepted from object space and transferred to image space. A property of the aperture stop is that all light emanating from a point in three-dimensional object space and accepted by the lens generally fills the aperture stop. Accordingly, the resultant image in image space within the camera is made up of an approximately even distribution of rays which have travelled equally throughout the entire area of the aperture stop. As a corollary, division of the aperture stop into right and left halves, each of which is alternately, synchronously occluded, results in the loss of approximately one-half of the light energy being transferred by the lens from object space to image space. As is well known in the art, an iris 28 is positioned immediately adjacent to or in the vicinity of the aperture stop so that the amount of light from object space can be easily controlled by adjusting the outer periphery of the aperture stop to increase or decrease the amount of light passed by the lens. The present invention is adapted for use with all types of photographic-objective lenses, including the meniscus anastigmats. Additionally, various telephoto and other lenses can also be modified in accordance with this invention.

A special light valve 30 is positioned either in front of the lens, behind the lens, or near the nodal point of the lens. The three-dimensional effect is accomplished by dividing the object lens 18 into mutually exclusive left-half light-valve element 32 and right-half light-valve element 34. Generally, the light valve elements are positioned contiguous to each other in a common plane.

The present invention may also be used to improve existing camera systems through modification of existing two-dimensional object lenses to include the bifurcated, dual-aperture light valve.

The present invention further includes a method for simultaneously broadcasting two-dimensional and three-dimensional images. The method includes the steps of generating a drive signal synchronized to a field rate; alternatingly and field-sequentially imaging, using the single imaging lens, a plurality of left-eye images and a plurality of right-eye images at the field rate; overlaying the plurality of left-eye images and the plurality of right-eye images on the single image space within the camera device; converting the plurality of left-eye images and the plurality of right-eye images to an image signal; transmitting the image signal to the remote viewing device; converting the image signal to the plurality of left-eye images and the plurality of right-eye images; optionally tuning the television tuner in each pair of viewing glasses to the selected station; transmitting the drive signal to each pair of viewing glasses; and alternatingly opening and closing, responsive to receiving the drive signal at the receiver of each pair of viewing glasses, the left-viewing-light valve and the right-viewing-light valve, at a rate synchronous with the field rate, for achieving three-dimensional effect. In the absence of the viewing glasses, the overlaying of the left-eye images and the right-eye images on the same image space causes the resulting combined image to appear as a two-dimensional image having normal clarity.

Camera Operation

There are basically two methods of producing stereoscopic imaging: simultaneous left-eye and right-eye viewing, and alternate left-eye or right-eye viewing. The difference between the two methods is that simultaneous-eye viewing at standard film or television refresh rates adds no additional flicker to the created stereoscopic image. Alternate-eye viewing, on the other hand, divides the refresh rates in half, with the result being unacceptable flicker at standard motion-picture and television refresh rates.

Alternate-eye viewing halves the refresh rate due to the fact that binocular-lens systems create images out of registration in the foreground and background, i.e., a white ball in field one of a television system produces a dark hole in field two of the same system; this continual switching from foreground to background results in the flicker rate being divided, half to the foreground and half to the background. If the field rate were 60 cycles, then a 30-cycle flicker results which is unacceptable for binocular television. To eliminate this problem for television and computer video-monitors, the prior art requires operating at double the standard refresh rate. Unfortunately, a doubled refresh rate results in a loss of one-half of the image resolution for each eye. The present invention, by contrast, produces the same ball without divergence at the focal point and, therefore, is able to operate at the standard 60-cycle refresh rate. The result is elimination of the dark hole for the opposite field and the production of a picture at standard television refresh rates with no more flicker than would be present in a standard, two-dimensional motion-picture theatrical display.

With reference particularly to FIGS. 2 and 3, assume a particular plane of interest in object space 42 is imaged on the focal plane of the imager in image space 44 and further assume that a plurality of foreground and background planes exist in object space. The plurality of foreground planes and background planes are imaged into background and foreground planes, respectively, in image space. These assumptions are reasonably based on principles well known in the art of the operation of lenses. Rays of energy emanating from an object in object space and capable of passing through the lens represent a single point in the plane of the aperture stop. Light received from the object completely fills the aperture stop. This last assumption neglects directed ray energy, i.e., light sources having a directed output, but this lack of generality is so minor as to be negligible. The plane of the light valve is divided into equal halves and each element of permissible image space 44, taken in the three-dimensional sense, is illuminated by a first group of rays and a second group of rays. The first group of rays pass through one light valve of the aperture stop in its alternated, non-occluded phase, while the second group of rays pass through the other side of the stop in its alternated, non-occluded phase. At each image location in three-dimensional image space, these groups converge into a composite image. Each of these two bundles, however, has a binocular separation or disparity relative to the aperture stop of approximately one-half the horizontal diametral dimension of the aperture stop.

The geometry of the situation is set forth in FIGS. 2 and 3 with reference to three posts 50, 52, 54 positioned in different planes of object space and their corresponding images 60, 62, 64 in image space. FIG. 3 also shows how each image in image space is constructed of the converged bundles emanating from opposite sides of the aperture stop.

Assume the lens is adjusted to bring a particular plane of interest in three-dimensional object space into focus on the imager plane. This can be accomplished by adjusting the distance of the lines or other appropriate geometry from the imager. More specifically, those images from the plane of interest in object space, which are formed into images in three-dimensional image space, are adjusted to fall into registration upon the imager. Images formed in front of or behind this image plane of interest are not in exact focus registration with the plane.

Reference is now made to the three posts 50, 52, 54 in object space, post 50 being in the plane of interest, post 52 being in the foreground, and post 54 being in the background. Post 50, being the image in the plane of interest, converges and appears as a coalesced and sharp image 60 at the imager surface. Foreground post 52, by contrast, becomes an image 62 lying in the background of image space and, accordingly, the separate ray bundles 62a, 62b converge where they intersect the plane of the imager. The result is slight lateral displacement or fringing of the exposure of the imager. The degree of fringing corresponds to the distance of the image 62 from the plane of the imager surface in image space. The distance of the image 62 from the plane of the imager surface is, in turn, directly and proportionally related to the counterpart distance of post 52 from the plane of interest in object space. Finally, post 54 in the background of the object space is imaged in front of or in the foreground of the image space by the image 64 formed by ray bundles 64a, 64b so that the image formation at the imager surface is accompanied by lateral displacement of the diverging ray bundles 64a, 64b impinging into the image 64. As with the relationship between foreground post 52 and image 62, the amount of displacement of the diverging ray bundles 64a, 64b is directly proportional to the displacement of post 54 in background object space relative to the corresponding displacement of image 64 toward the foreground of image space.

The resulting image formed from exposure of the plane of interest is characterized by a number of properties which, with the exception of U.S. Pat. No. 3,712,199 to Songer, Jr., entitled THREE-DIMENSIONAL COLOR PHOTOGRAPHIC PROCESS, APPARATUS AND PRODUCT, distinguish the image from prior art three-dimensional images. First, the image space in which the imager is located is singular, i.e., the image space contains only one set of images formed by ray bundles traveling equal-length, symmetric paths from object space through a single aperture. As a result, there is no path-length difference in the image space and, therefore, no distortion due to path-length difference. Keystone also is eliminated. Keystone results from viewing object space from spaced-apart apertures, and causes the resultant image to lose detail at the periphery, particularly the corners. This loss in detail is due to the distortion which results when an originally square pattern is reproduced larger on one side than on the other side.

The resulting product can also be adjusted to eliminate sharp double-images. Sharp double-images in peripheral vision are annoying to most viewers and do not correspond to what is actually seen in normal vision. Through adjustment of the iris for limited depth of field, all stereoscopic information is automatically carried in the unfocused blur of a single set of image-space data. The resultant product is particularly acceptable since the unfocused blur of the present product corresponds with subjective human vision, i.e., the double-blurred mental image of human vision and that produced in the present invention are very similar. For example, the fusing of double images by the convergence angle of the viewer corresponds directly to double-image convergence in unaided vision and, as a consequence, the viewer is subjected to a minimum of discomfort since he is already quite used to the physical manipulation of the eyes needed to view the present invention; this physical manipulation is the same process he has become accustomed to using in ordinary vision. This similarity between perceived images translates into an appreciable reduction in the discomfort experienced when viewing stereoscopic images as compared with the viewing of stereo photographs containing sharp double-images.

Another similarity between human vision and the image created by the current invention results from the subjective impression of increased contrast of the image upon fusing of the fringes by the viewer. Fusing of the fringes confirms correct viewing in the viewer's mind and enhances the three-dimensional effect. The increased contrast of the image corresponds to the contrast experienced in the unaided vision of object space; namely, the total-brightness impression from an object is seen as much reduced when only focused upon by one eye. In this connection a large improvement in the foreground and background image quality is achieved upon convergence by the viewer, for, as the left-edge and right-edge fringes of objects are brought into registration, the entire detail of the object is considerably improved and sharpened. However, the upper and lower edges can contain unfocused blurs and are not improved since the viewer can only supply horizontal convergence and not vertical convergence.

Additional adjustments can be made when necessary to eliminate flicker. For example, when viewed by the unaided eye, a brightness-shading error can result in a left-and-right flicker. As the light valve is divided in half, the centers of the right half and the left half are offset by the aperture diameter, which causes one-half of the opposite error in the other half. This offset may be corrected by using a two-element lens, bifurcated at the vertical center, with the liquid crystal located between the two elements. Other approaches may be used.

An important advantage of the present invention is its relative freedom from critical dimension factors. As previously mentioned, certain mis-orientations and misalignments such as horizontal displacement, or angular misorientation due to rotation of the light valve about the optic axis of the lens, are not critical with the present invention. In addition, unlike many three-dimensional stereoscopic systems in the prior art, the present invention is particularly free of distortion as a function of the angular orientation of the viewer's head. Very often viewers will desire, for the sake of comfort, to angularly orient their heads at a slight cant. In prior systems this often resulted in double-image distortion and immediate loss of the three-dimensional effect. In the present system, by contrast, such angular mis-orientation is not critical and does not result in loss of the three-dimensional effect until a rather appreciable offset from vertical is reached.

The following paragraphs present an analysis of how the picture created by the present invention is viewed with stereoscopic effect and how each element thereof is created.

Figure 6:
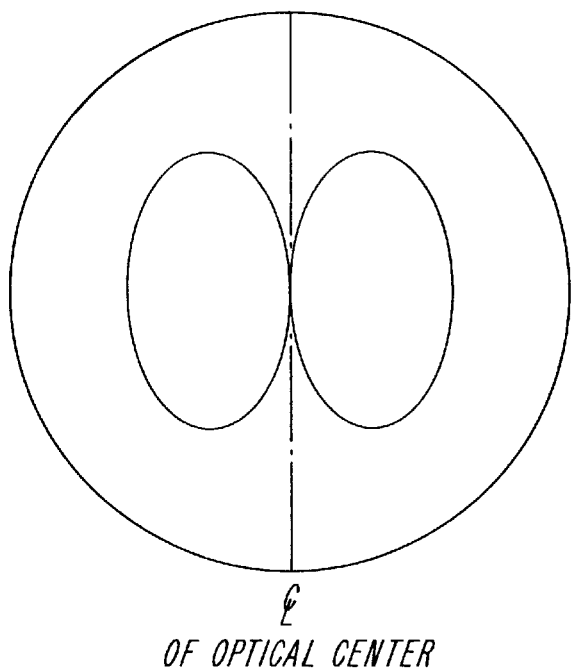
FIGS. 6 and 7 illustrate alternate forms of light valves wherein certain portions are masked out or blanked.
Figure 7:
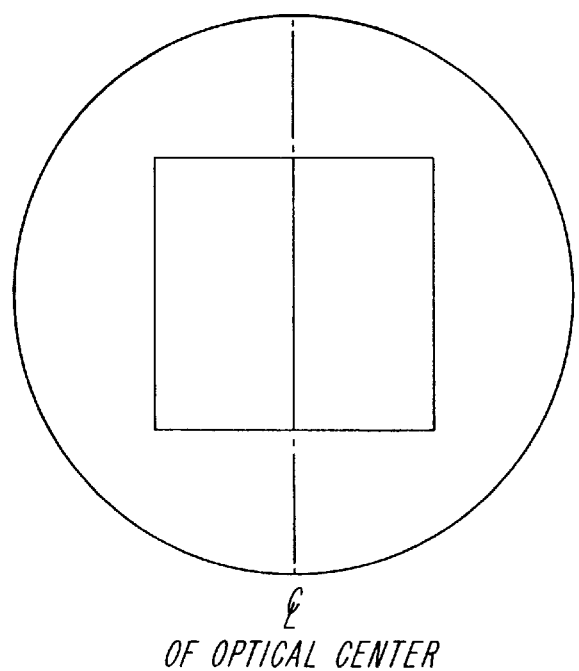

FIGS. 6 and 7 illustrate light valves constructed such that definition in the upper and lower edges of the images is rendered comparable to that which can be achieved by horizontal convergence of the lateral edges by the viewer. These light valve specifications are the same as those discussed in connection with the embodiment of FIGS. 2 and 3. Each light valve incorporates a left light-valve and a right light-valve. However, the light valves are partly masked or blanked out at their upper or lower portions so that they resemble two elliptical shapes as shown in FIG. 6, or two rectangular shapes as shown in FIG. 7. Virtually any shape in which the rays that travel predominantly along vertically displaced paths through the lens are selectively eliminated as compared to those rays that travel predominantly on horizontally displaced paths would achieve this purpose.

FIG. 6 shows two light valves, in conjunction, utilizing two elliptical disc-filter elements positioned approximately mid-position on each side of the juncture of the two light valves at the aperture stop, blocked by opaque material on all sides. This configuration works equally well for both three-dimensional viewing and two-dimensional viewing. FIG. 7 shows two rectangles positioned in the same way as were the elliptical disc-filter elements in FIG. 6. This configuration works best for viewing three-dimensional images through a special viewing device, but does not work as well for two-dimensional viewing with the unaided eye.

Figure 9:
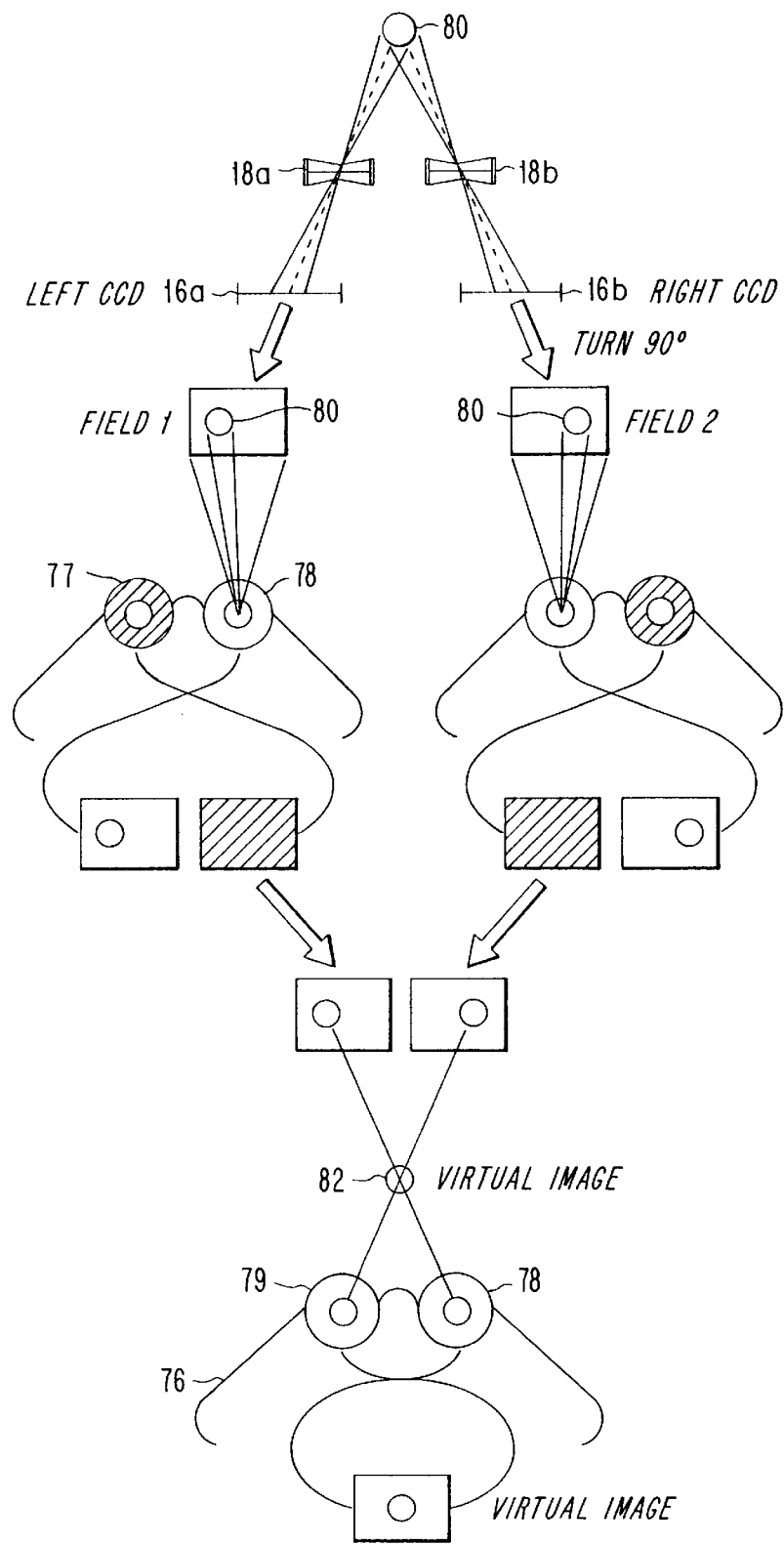

FIG. 9 illustrates a prior art binocular system with a white ball as the object image. Utilizing a binocular lens system 18a, 18b on a television camera (not shown), two images are created in the two different fields of an interlaced frame. One image is for the right eye on one side of the one field, and the other image is for the left eye on the other side of the other field. The ray bundles of the field for the right eye cross the ray bundles of the field for the left eye, creating a virtual, stereoscopic image 82 at the point where the ray bundles intersect. When the light valve 78 governing the image of the right eye is open, the ball appears on one side of the field with nothing on the other side. When the light valve 79 governing the image for the left eye is open, the ball appears on the opposite side of the field from where it appeared for the right eye. This creates a flicker which can only be overcome by doubling the standard refresh rate which, as noted earlier, makes television broadcast of this prior art system impossible.

Figure 8:
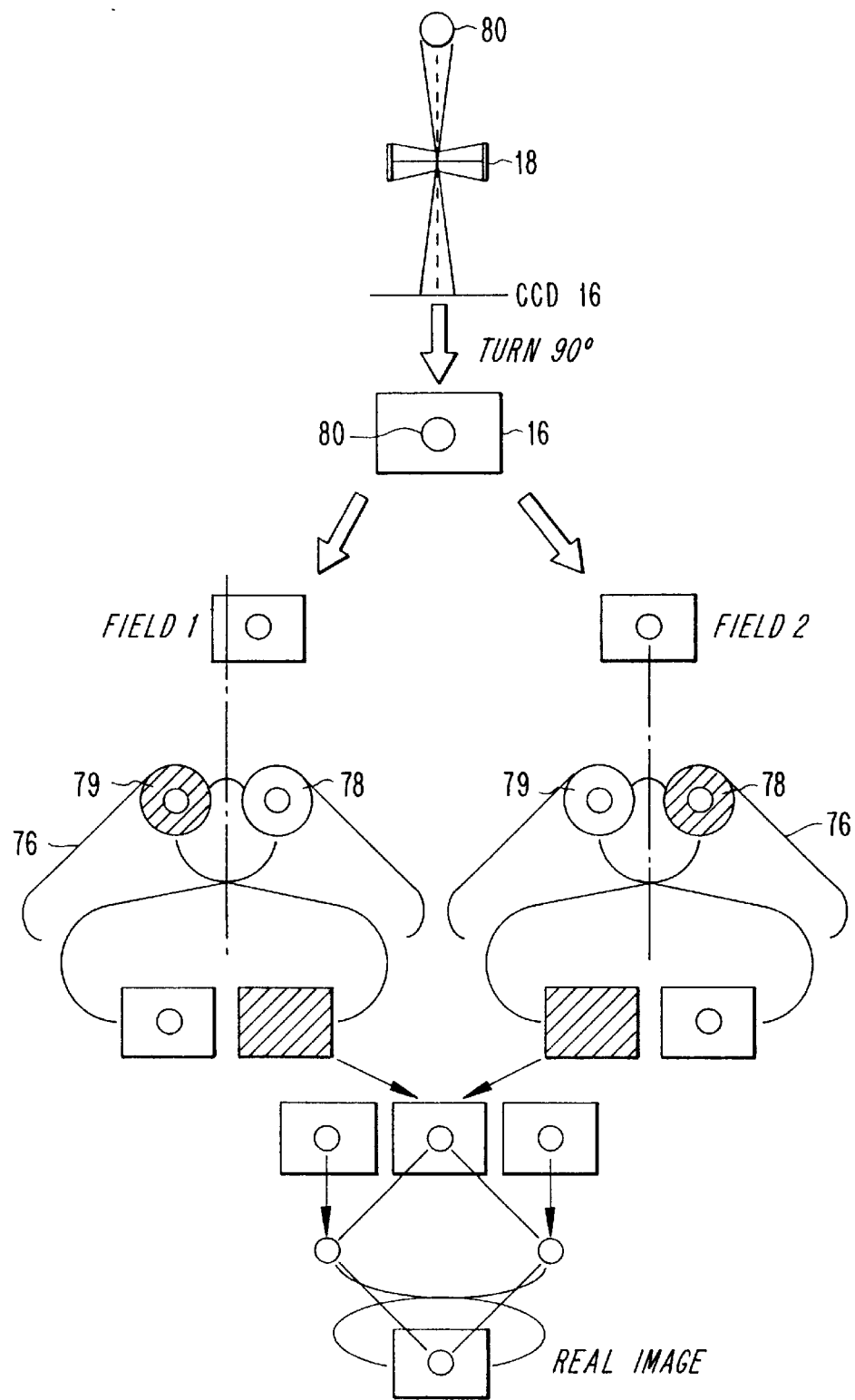
FIGS. 8 and 9 illustrate the difference between binocular lens prior art devices and the present invention.

In the present invention, as illustrated in FIG. 8, the position of the white ball 80 appears almost the same in both fields that constitute a frame. Because the ball may appear slightly out of focus, the viewer either converges or diverges his eyes to bring the ball into focus, producing a three-dimensional effect in the mind's eye—which is exactly where the three-dimensional effect associated with real vision of object space is produced.

To those skilled in the art to which this invention relates, many other modifications and adaptations thereof will suggest themselves. The present invention is immediately applicable, by way of example, to macroscopic and microscopic photographic systems. It is readily seen that such objectives can be modified to include light valves of the type disclosed herein. The degree of size reduction to which the present invention is adapted for use does not appear to be limited except by way of limitations which would also apply to an optical system.

Furthermore, the system disclosed in the present invention can be applied to motion pictures. At twenty-four frames-per-second, a satisfactory three-dimensional image with an acceptable level of flicker may be obtained by utilizing a four-bladed shutter on the motion picture projector. If this standard were increased to 30 frames-per-second, as is being considered by the film industry, a three-bladed shutter would produce an acceptable level of flicker and, on some projectors, the standard two-bladed shutter would produce an acceptable level of flicker.

Operation of the Wide-Range Synchronization Signal

As embodied broadly herein and depicted in FIG. 1, the present invention uses a viewing device comprising a transmitter 15 and a television receiver 86 set to a predetermined channel. In any given metropolitan area of the world, vertical synchronization from the major television networks is normally within the range of any television transmitter in that given metropolitan area. The detected vertical-synchronization information produces an odd and even vertical-field timing-pulse synchronous to the selected channel. Based on this vertical-synchronization information, a switch alternates the nonoccluding features of first the left-viewing-light valve 77, and then the right-viewing-light valve 78.

As a general rule the major television networks in an area are relatively frame-locked. The playback apparatus, whether video disk, video cassette recorder, off-air transmission, or live camera, is gen-locked by a frame synchronizer to the specific channel to which the viewing device is tuned. As used in this application, "gen-locked" means the playback apparatus is synchronized by the frame synchronizer to a particular channel. As a result, there can be an unlimited number of viewers in any viewing situation at any visible distance from the viewing screen without loss of synchronization.

Figure 10:
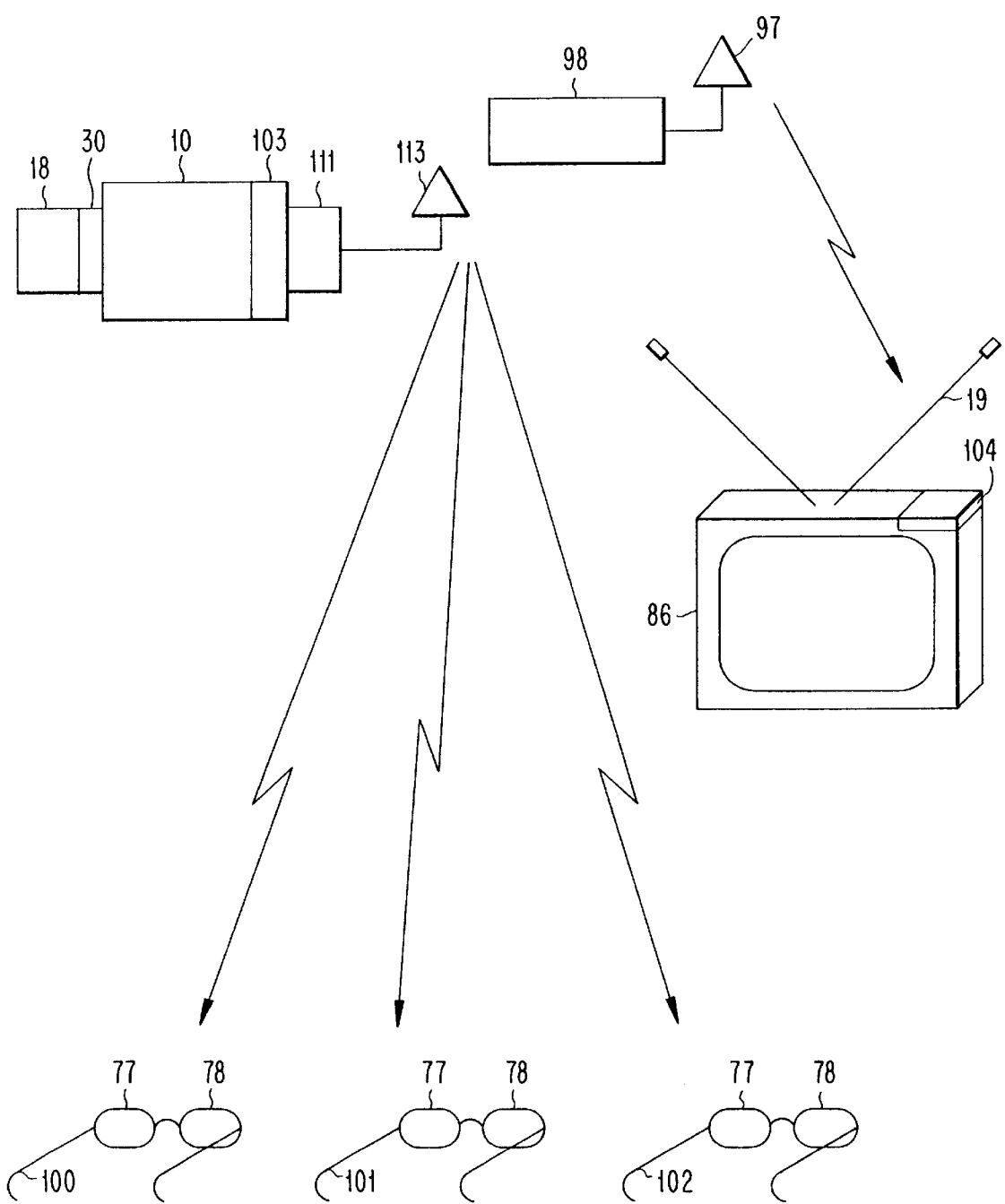
FIG. 10 shows a simplied diagram of the alternate embodiment including a camera device, a remote viewing device, and a plurality of pairs of viewing glasses.
Figure 11:
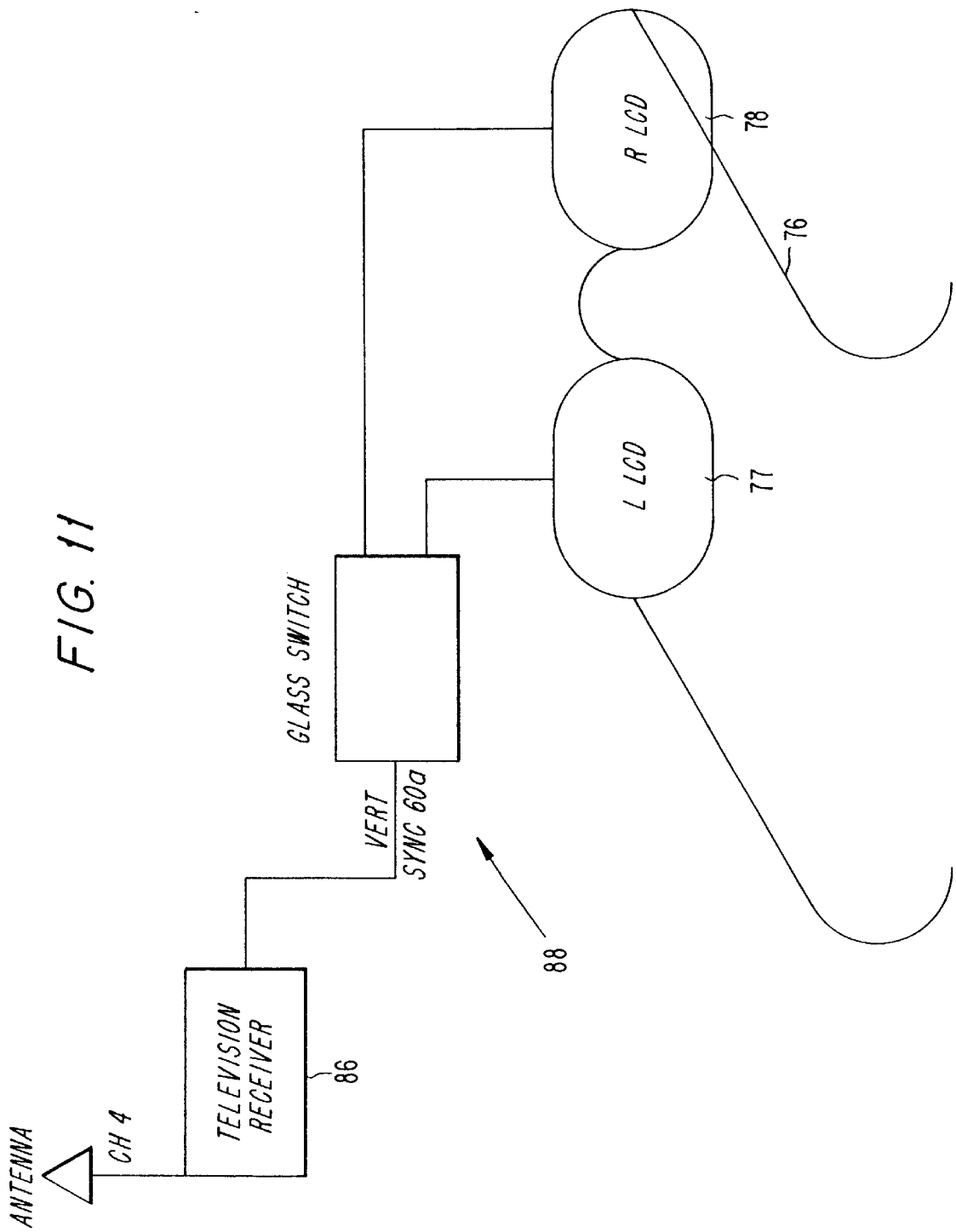
FIG. 11 shows the basic components of a pair of viewing glasses configured for use in the alternate embodiment.

In the alternative embodiment broadly illustrated in FIGS. 10 and 11, the present invention comprises a camera device 10, a remote viewing device 86, first means for transmitting an image signal to the remote viewing device, a plurality of pairs of viewing glasses 100, 101, 102, and second means for transmitting a drive signal to the plurality of pairs of viewing glasses.

The camera device includes a single imaging lens 18, a bifurcated, dual-aperture light valve 30 located within the single imaging lens, and means for converting a plurality of left-eye images and a plurality of right-eye images to an image signal. The camera device can be embodied as a television camera, a motion picture camera, or other electronic or mechanical camera device.

The remote viewing device 86 includes receiving means and means for reconverting the image signal to the plurality of left-eye images and the plurality of right-eye images. The remote viewing device may be embodied as, but is not limited to, a silver screen, a television or a VCR, gen-locked to a selected channel of a local television station.

Each of the plurality of pairs of viewing glasses includes a left-viewing-light-valve, a right-viewing-light valve, television tuning means for tuning to a specific channel, and receiving means for receiving a drive signal and for producing an odd and an even vertical-field timing pulse synchronous to the specific channel.

As illustrated in FIGS. 10 and 11, the camera device is embodied as a television camera 110. The remote viewing device is embodied as a television receiver 86. The first means for transmitting the image signal to the television is embodied as a local television station 98 and broadcast transmitter 97. The second means for transmitting the drive signal is embodied as a signal generator 11 and an antenna 13. The plurality of pairs of viewing glasses are embodied as a plurality of eyeglasses 100, 101, 102. Each of the plurality of eyeglasses 100, 101, 102 includes a left-viewing-light valve 77 and a right-viewing-light valve 78. The left-viewing-light valve 77 and the right-viewing-light valve are embodied as LCDs. The receiving means within each of the plurality of eyeglasses 100, 101, 102 is embodied as a sync separator and field identifier 88 having a glass switch and vertical synchronizer. The television tuning means is embodied as a micrologic television tuner 86 with an antenna.

To render the viewing glasses 100, 101, 102 virtually immune from interference by infrared pulses from random lights in the viewing environment, horizontal timing pulses are transmitted from the sync separator and field identifier 88 to the viewing glasses 100, 101, 102. These timing pulses utilize field-code synchronization pulses with odd and even field-equalization pulses to avoid low-frequency interference, using a technology similar to the National Semiconductor LM 1881 CMOS synch separator with vertical ID pulses.

Special Effects

Figure 12:
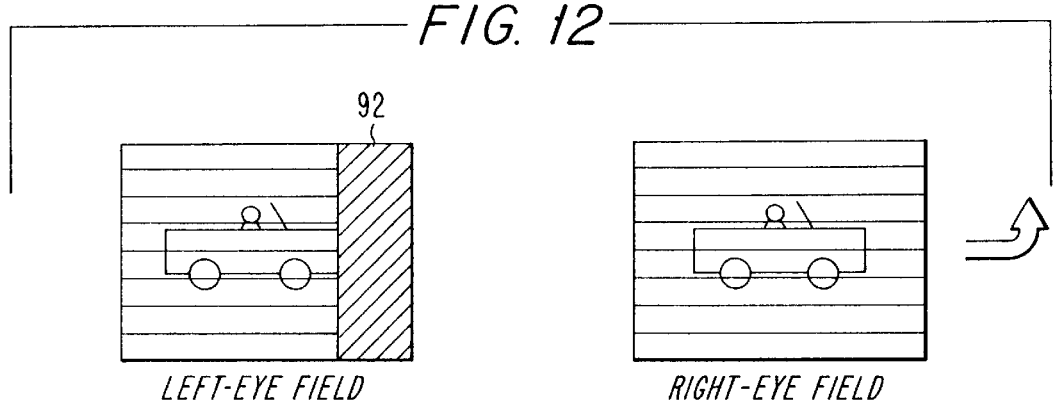
FIG. 12 illustrates the use of electronic matting to create the sensation of the viewing plane tilting, depending on the placement of the mattes, either about the vertical or horizontal axes.

As depicted in FIG. 12, an electronic, adjustable matte 92 can be inserted vertically on one side of the left-eye field while the entire image appears in the right eye field. Such an adjustable matte 92 can be used to create an illusion similar to the condition when, because of parallax, one eye can see further around a corner than the other eye.

Figure 13:
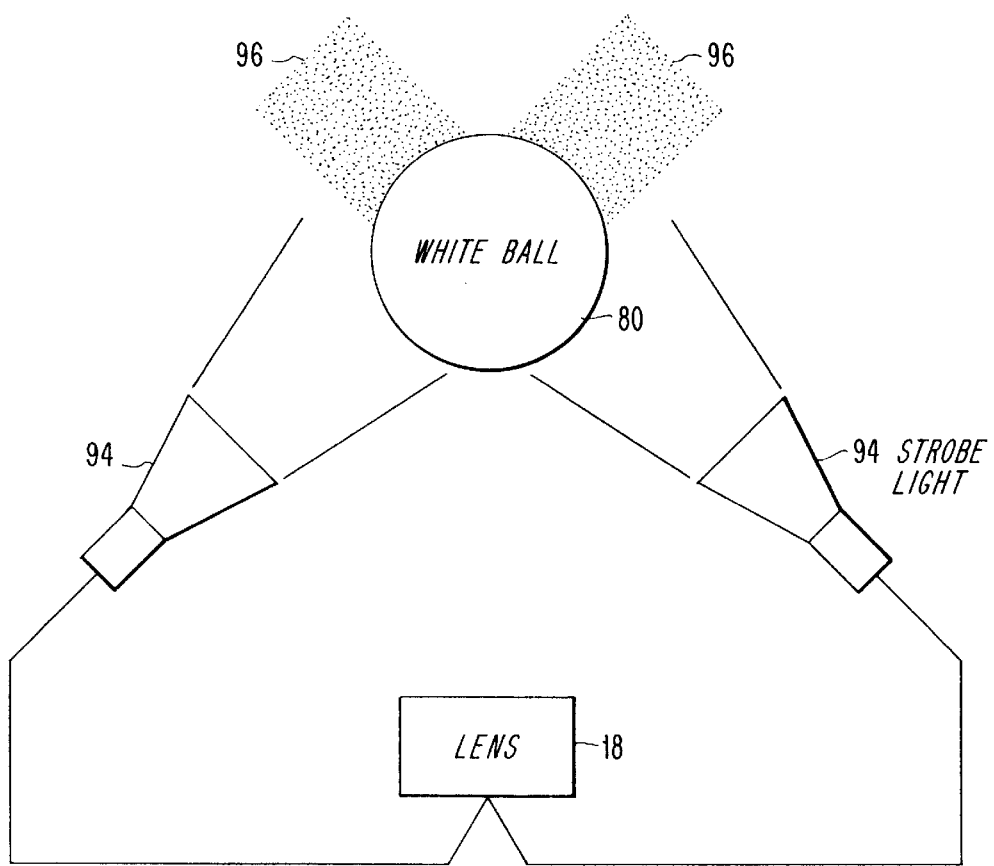
FIG. 13 illustrates the use of strobe lights to enhance the three-dimensional illusion of depth.

Similarly, as depicted in FIG. 13, strobe lights 94 synchronized to the light valves in the lens can be employed to create deeper shadows 96 behind the ball 80 in the object plane, thereby exaggerating the depth illusion of the three-dimensional effect.

In general the objects of the invention as outlined in the Summary of the Invention and as discussed in the Detailed Description, are achieved by providing a three-dimensional imaging system utilizing a vertically divided light valve positioned before, behind, or at the nodal point of a standard photographic objective or taking lens. The light valve includes a right-half and left-half which pass approximately equal views. The lens still continues to produce a single image-space corresponding element-for-element to object space. Images formed at the image focal plane, i.e., the imaging surface, are coalesced into registration by the lens to yield an image at the imaging surface containing one set of focused and converged images corresponding to the plane of interest in object space. Object images which are located before or after the focal plane in image space, due to correspondence in foreground or background planes in object space, are converged into single images either in front of or behind the imaging surface and, as a result, would normally appear as blurred images as they pass through the focal plane. However, by passing the light rays through the alternatingly non-occluded light valves, such images are characterized by being formed of left-hand and right-hand bundles which strike the imaging surface with an image having left-edge and right-edge fringes. The amount of fringing or the width of the fringes' edges corresponds directly and proportionally to the binocular disparity caused by the remoteness of the object from the object plane of interest in object space. Furthermore, depending on whether the image originates in the foreground or background of object space, and also depending on whether the image is of a bright or dark object, the orientation of each image-fringing system with respect to another reverses. Accordingly, a completely resolvable set of data is presented and imaged which can subsequently be viewed through an alternatingly non-occluded left-viewing-light valve and right-viewing-light valve corresponding and synchronized to those positioned in the taking lens. When so viewed, the viewer has a natural tendency to converge or diverge his eyes slightly to bring these image edges into registration. The viewing device increases the depth of field of the camera lens since the eyes can re-register the foreground and background images. This results in image clarification in the viewer's mind, while the eye movement involved in reaching this image clarification produces a psychophysiological three-dimensional effect because of the associated convergence or divergence.

When viewed without the viewing device, the image resembles a normal picture taken through a standard two-dimensional lens. This two-dimensional/three-dimensional viewing compatibility is possible because the three-dimensional characteristics of the invention provide the same depth of field as under normal, two-dimensional conditions.

It will be apparent to those skilled in the art that various modifications can be made to the two and three-dimensional imaging system of the instant invention without departing from the scope or spirit of the invention, and it is intended that the present invention cover modifications and variations of the two and three-dimensional imaging system provided they come within the scope of the appended claims and their equivalents.

I claim:

1. A two-dimensional and three-dimensional imaging system for imaging and viewing, by a viewer having a left eye and a right eye, color and monochrome images simultaneously two-dimensional and three-dimensional, with the simultaneously two-dimensional and three-dimensional color and monochrome images meeting any of NTSC, PAL, SECAM, and other world-wide electronic viewing formats, comprising:
   a. a camera device including,
      i. means for generating a drive signal synchronized to a vertical field rate;
      ii. a single imaging lens; and
      iii. a single bifurcated, dual-aperture light valve, located within proximity of the single imaging lens, responsive to the drive signal, for alternatingly and field-sequentially imaging, at the field rate, an object as a plurality of left-eye images and a plurality of right-eye images, overlaid on a single image space;
   b. a viewing device for displaying the plurality of left-eye images and the plurality of right-eye images;
   c. means for transmitting the drive signal; and
   d. at least one pair of viewing glasses including,
      i. a left-viewing-light valve for operating over the left eye, with said left-viewing-light valve, responsive to receiving the drive signal from said transmitting means, opening and closing synchronized with the field rate, for viewing the plurality of left-eye images;
      ii. a right-viewing-light valve for operating over the right eye, with said right-viewing-light valve, responsive to receiving the drive signal from said transmitting means, opening and closing synchronized with the field rate, alternatingly from said left-viewing-light valve, for viewing the plurality of right-eye images; and
      the left-viewing-light valve and the right-viewing-light valve enabling the viewer, with the viewing glasses, to see the plurality of left-eye images and the plurality of right-eye images as a three-dimensional image, the viewer without the viewing glasses seeing the plurality of left-eye images and the plurality of right-eye images as a two-dimensional image having normal clarity and definition.

2. The imaging system as set forth in claim 1, further including:
   means for converting the plurality of left-eye images and the plurality of right-eye images to an image signal; and
   said viewing device including means for reconverting the image signal to the plurality of left-eye images and the plurality of right-eye images, for displaying the plurality of left-eye images and the plurality of right-eye images.

3. The imaging system as set forth in claim 1, with said transmitting means including a transmitter at the viewing device for transmitting the drive signal to the viewing glasses.

4. The imaging system as set forth in claim 3, with said pair of viewing glasses further comprising a drive circuit for receiving the drive signal.

5. The system as set forth in claim 1, with said left-viewing-light valve and said right-viewing-light valve including liquid crystal diodes.

6. The system as set forth in claim 1, further comprising blocking means for blocking out a percentage of light rays passing through an upper extreme and a lower extreme of each valve-half of the bifurcated dual-aperture light valve, for reducing upper and lower edgewise blur.

7. The system as set forth in claim 6, with said blocking means including an opaque stop about two ellipses, one of each of the two ellipses in each of the valve-halves, respectively, of the bifurcated dual-aperture light valve, with the two ellipses abutting at an optical axis of the single imaging lens.

8. The system as set forth in claim 1, with the dual-aperture light-valve positioned at the nodal point of the imaging lens.

9. A two-dimensional and three-dimensional imaging system for simultaneously imaging color and monochrome images as two-dimensional and three-dimensional images meeting any of NTSC, PAL, and SECAM broadcast standards, and for viewing, by a viewer having a left eye and a right eye, the color and monochrome images as one of two-dimensional images having normal clarity and definition when viewed without three-dimensional viewing glasses and as three-dimensional images when viewed with the three-dimensional viewing glasses, according to viewer preference, comprising:
   a camera device including,
      means for generating a drive signal;
      means for focusing an image of an object;
      means, responsive to the drive signal, for alternatingly and field-sequentially imaging, at the field rate, the object as a plurality of left-eye images and a plurality of right-eye images; and
      first means, having a single image-space, for converting the plurality of left-eye images and the plurality of right-eye images to an image signal;
   means for transmitting the drive signal and the image signal;
   means for displaying the image signal;
   second means, located within the displaying means, for converting the image signal to the plurality of left-eye images and the plurality of right-eye images; and
   at least one pair of viewing glasses including,
      means for receiving the drive signal,
      left means, located over the left eye, responsive to the drive signal received by said receiving means, for opening and closing synchronized with the field rate to allow viewing the plurality of left-eye images;
      right means, located over the right eye, responsive to the drive signal received by the said receiving means, for opening and closing with the field rate, alternatingly from said left means, to allow viewing the plurality of right-eye images;
   said left means and said right means enabling the viewer, with the viewing glasses, to see the plurality of left-eye images and the plurality of right-eye images as a three-dimensional image on the displaying means, the viewer, without the viewing glasses, seeing the plurality of left-eye images and the plurality of right-eye images as a two-dimensional image on the displaying means.

10. The system as set forth in claim 1 or 9, with said transmitting means including a radio frequency transmitter.

11. The system as set forth in claim 1 or 9, further comprising recording means for recording the plurality of left-eye images and the plurality of right-eye images.

12. The system as set forth in claim 11, with said recording means including video tape.

13. The system as set forth in claim 1 or 9, with said means for generating a drive signal including a vertical synchronization pulse generator for generating the drive signal as a vertical synchronization pulse.

14. The system as set forth in claim 9, with said left means and said right means including liquid crystal diodes.

15. The system as set forth in claim 1 or 9, with the camera device including a television camera.

16. The system as set forth in claim 1 or 9, with the camera device using a standard television format of 50 Hz, 60 Hz, 72 Hz, or 120 Hz.

17. The system as set forth in claim 1 or 9, with the camera device using television formats at any vertical field frequency from 48 Hz to 400 Hz of electronic display devices.

18. A simultaneously two-dimensional and three-dimensional imaging and viewing system for a viewer having a left eye and a right eye, using a camera device having a single imaging lens with a single bifurcated, dual-aperture light valve for alternatingly and field-sequentially imaging, responsive to a drive signal, a plurality of left-eye images and a plurality of right-eye images at a field rate to create a simultaneously two-dimensional and three-dimensional image, the simultaneously two-dimensional and three-dimensional image meeting any of NTSC, PAL, and SECAM broadcast standards, comprising:

a viewing device for displaying the simultaneously two-dimensional and three-dimensional image;

means for transmitting the drive signal; and at least one pair of viewing glasses including,
  a left-viewing-light valve for operating over the left eye, with said left-viewing-light valve, responsive to receiving the drive signal from said transmitting means, opening and closing synchronized with the field rate, for viewing the plurality of left-eye images;
  a right-viewing-light valve for operating over the right eye, with said right-viewing-light valve, responsive to receiving the drive signal from said transmitting means, opening and closing synchronized with the field rate, alternatingly from said left-viewing-light valve, for viewing the plurality of right-eye images;

the left-viewing-light valve and the right-viewing-light valve enabling the viewer, with the viewing glasses, to see the simultaneously two-dimensional and three-dimensional image as a three-dimensional image, the viewer, without the viewing glasses, seeing the simultaneously two-dimensional and three-dimensional image as a two-dimensional image having normal clarity and definition.

* * * * *